Dec. 19, 1967     W. V. SHEARER ETAL     3,358,637

TONER UNIT FOR PHOTOELECTROSTATIC REPRODUCTION EQUIPMENT

Original Filed April 24, 1962     6 Sheets-Sheet 1

INVENTORS.
WALTER V. SHEARER
WILLIAM R. BECK, JR.
ARNOLD M. WHEELOCK, SR.

Cleveland B. Hallabaugh

ATTORNEY

United States Patent Office 3,358,637
Patented Dec. 19, 1967

3,358,637
TONER UNIT FOR PHOTOELECTROSTATIC REPRODUCTION EQUIPMENT
Walter V. Shearer, Longmeadow, William R. Beck, Jr., Wilbraham, and Arnold M. Wheelock, Sr., Southwick, Mass., assignors to The Plastic Coating Corporation
Original application Apr. 24, 1962, Ser. No. 189,758, now Patent No. 3,180,239. Divided and this application Dec. 23, 1964, Ser. No. 420,514
11 Claims. (Cl. 118—7)

ABSTRACT OF THE DISCLOSURE

Apparatus is disclosed for applying powdered solid resinous toner to the surface of a copy sheet which has an electrostatic image carried by a photoelectrostatic coating thereon. The apparatus includes a stationary cylindrical core of nonmagnetic material which core has a plurality of longitudinal grooves countersunk in its cylindrical surface at spaced intervals around its circumference in which grooves strips of permanently magnetic material are positioned. A rotatable cylindrical core or shell of nonmagnetic material is disposed about the stationary core. The apparatus includes a two compartment tray for containing a body of toner mix in contact with the lower part of the rotatable cylinder. The apparatus also includes a doctor blade disposed along the length of the rotatable core or shell, spaced uniformly from the surface of the shell and at a location at which the surface of the rotatable shell or cylinder is moved in an upwardly direction. One embodiment of the apparatus disclosed includes a means for adjusting the circumferential position of the stationary cylindrical core and for locking it in its adjusted position. The apparatus also includes rotatable stirrers in at least one of the compartments of the tray for uniformly mixing the toner mix prior to its being picked up by the rotatable cylinder or shell. A specific embodiment of the apparatus has a longitudinal slot connecting the compartments of the two compartment tray and a grooved rotatable cylinder positioned within the second compartment of the tray adjacent the longitudinal slot which closes the slot when stationary and transfers fresh toner mixture from the second compartment into the first compartment when rotated. The disclosure also describes mechanical means and electrical means for operating the toner apparatus in a specified manner.

This application is a division of our copending application, Ser. No. 189,758, filed Apr. 24, 1962, now Patent No. 3,180,239.

This invention relates to a unit for the application of a powdered resinous toner to a latent electrostatic image formed in the photoelectrostatic reproduction of an optical image to convert the latent image to a visible image.

The patent referred to above describes automatic apparatus for the photoelectrostatic reproduction of images, which includes as an essential component the toner unit described and claimed by this application. The usefulness of this toner unit is not limited to the particular apparatus described by that application. It is well adapted for use with any apparatus for photoelectrostatic reproduction in which a dry toning powder is used.

Briefly described, the process of photoelectrostatic reproduction in which the apparatus of this invention includes the following sequence of essential steps. A sheet carrying a photoelectrostatic coating is subjected to a corona discharge to impose an electrostatic charge on the photoelectrostatic coating on the sheet while the sheet is in darkness. The charged surface is then exposed to an optical image to be reproduced to produce a latent electrostatic image, which is then converted into a visible image by the application of a powdered solid or a liquid toner. The visible image produced by the use of a colored, powdered solid toner is made permanent by subjecting the image to heat to fuse the powdered toner.

The toner unit in accordance with this invention applies a powdered solid toner to the surface of a photoelectrostatic sheet carrying a latent electrostatic image while in darkness by at least one and preferably two or more magnetic brushes. This unit is adapted to tone a latent electrostatic image on a photoelectrostatic sheet which is passed in contact with the magnetic brush or brushes of the unit and under a bias shoe or shoes of the unit by a suitable conveyor system, with the latent electrostatic image facing downwardly. The magnetic brush is formed on a cylinder of a non-magnetic material which rotates around a stationary magnetic core, with the lower periphery of the non-magnetic cylinder immersed in a mixture of a powdered, solid resinous toner and a powdered, magnetic solid such as powdered iron.

During the operation of this toner unit, the toner powder is deleted from the toner mixture since it selectively adheres to the latent electrostatic image, while the magnetic particles of the mixture are largely retained by the magnetic attraction by the stationary core within the rotating cylinder of non-magnetic material. This toner unit is provided with a mechanism by which toner powder or an enriched toner mixture is added to the body of toner mixture in which the non-magnetic cylinder is rotating to replace the deleted toner powder. This mechanism can be manually operated by remote control as may be desired or set to operate automatically as will be fully explained hereinafter.

This toner unit comprises at least one cylindrical, stationary core of a non-magnetic material such as, for example, brass, which has lengthwise grooves which are circumferentially spaced apart. Longitudinal, permanent magnets which may be of the plastic type are positioned within these grooves and substantially completely fill them to complete the cylindrical surface of the stationary core. Each of these permanent magnets has a length equal to the width of the image area of the sheet to be toned. A preferred embodiment of this stationary core carries six such longitudinal, permanent magnets at circumferentially, equally spaced intervals around about 230° of its circumference. The rotary position of this core is capable of adjustment and of being firmly held in the desired position with respect to the permanent magnets in its surface. A rotatable, closely fitting, cylindrical sleeve of a non-magnetic material such as, for example, brass, is positioned around this stationary core and has a means for its rotation around the core. The combination of a stationary core, the means for adjusting its circumferential position, the outer sleeve and the means for its rotation around the stationary core will be referred to hereinafter as a "magnetic brush unit."

One of these magnetic brush units, and preferably two or more of them, are located within a longitudinal tray and spaced apart from its bottom. Also located within this tray below the magnetic brush unit or units is at least one, and preferably two or more, rotary stirrers or agitators. In the embodiment of this unit described hereinafter with reference to the drawings, four such agitators are located below the two magnetic brush units with their axes parallel to the axes of the magnetic brushes. Each such agitator is provided with means for its rotation around its longitudinal axis.

This magnetic toner unit is located in the apparatus with the axes of its magnetic brush units at right angles to the direction of travel of a sheet carried by a conveyor system.

When in use, this longitudinal tray is filled with a toner mix to a level such that the lower surface of the magnetic brushes are immersed therein. This toner mix is a mixture of a powdered resinous toner and particles of a magnetic material such as, for example, iron, which is well known to the art. The toner used for the direct production of copies is colored. That used for the production of a master which is to form a lithographic printing plate may or may not be colored, but is preferably colored to facilitate the visual inspection of the image. The toner may be one which acquires a positive charge in the toner mixture. Such a toner tones the negative image areas of a latent electrostatic image, and produces a positive copy. Alternatively, the toner may be one which assumes a negative charge. Such a toner is repelled by the negative image areas and tones the background areas of a latent electrostatic image and produces a negative reproduction of the original image.

The rotation of the cylindrical sleeve within the toner mix forms a brush on the portion of the outer surface of the rotating sleeve which is adjacent the magnets of the stationary core. This magnetic brush is continuously formed and disrupted as the sleeve rotates, since it exists only on the segment of the sleeve which is adjacent the permanent magnets of the stationary core of the unit at any instant. The portion of the sleeve adjacent the circumferential portion of the core which has no permanent magnets cannot retain magnetic brush.

Further, the end sections of the sleeve adjacent the end sections of the core which do not carry the permanent magnets do not form a magnetic brush. The width of the magnetic brush which is formed is equal to the lengths of the permanent magnets of the core which, as already noted, are made equal in length to the width of the image area on the sheet to be toned. Thus, the marginal areas of the sheet do not come into contact with the magnetic toning brush or brushes, as the case may be, and hence, cannot pick up residual toner and become dirty in appearance, even if they carry a residual electrostatic charge.

A doctor blade may, if desired, be located adjacent the sleeve of the magnetic brush in a position to smooth the surface of the magnetic brush on the sleeve as it rotates to its uppermost position in which it contacts a photoelectrostatic sheet passing over the toner unit. This doctor blade corrects any tendency of the magnetic brush to have a non-uniform surface.

An insulating idler roll is positioned ahead of the toner brush unit, and another just after it. In a toner unit carrying tow or more magnetic brush units, an insulating idler roll is located between them. The upper peripheries of these idler rolls are just below the upper periphery or peripheries of the magnetic brush or brushes, as the case may be, which are formed during the operation of this unit. The purpose of these rolls is to support the trailing end of the sheet being toned. The last of these insulating rolls, i.e., the one on the forwardly side of the toning unit is particularly important in that it prevents the trailing end of the sheet being toned from flipping into the edge of he toner tray as it passes away from the toner unit and thereby avoids the tendency which it would otherwise have to knock the toner mix out of the toner tray.

This continuous disruption of the magnetic brush or brushes, as the case may be, in combination with the action of the agitators of the unit in continually stirring the toner mix is an important feature of this toner unit. It continually provides in the magnetic brush a toner mix composition which is substantially the same as that of the body of the mix within the tray of the unit despite the continuing depletion of the toner from the magnetic brush by deposition on the electrostatic image of the photoelectrostatic sheets brought into contact with the brush or brushes of the unit.

The mechanical stirrers for the toner mix described above provide an effective means for stirring the toner mix to keep its composition uniform. In an alternative embodiment of this toner unit which carries two or more magnetic brush units, the agitation of the toner mix is effected by means of one or more magnetic stirrers located beneath and adjacent to the bottom of the tray of the toner unit which is preferably sinuous in contour across its length with parallel semi-cylindrical depressions separated by a convex semi-cylindrical hump which corresponds to a concave semi-cylindrical depression in its lower surface. The axis of each of the magnetic brush units is directly above and parallel to the axis of one of the semi-cylindrical depressions in the bottom of the toner tray.

As an alternative to the above-described mechanical stirrers, one or more magnetic stirrers may be used. The magnetic stirrer may be a rotatable, magnetic cylinder comprised of a generally cylindrical body of a non-magnetic material carrying longitudinal strips of permanently magnetic material spaced apart around its circumference. This magnetic cylinder is located beneath the bottom of the toner tray with its axis parallel to the axis of the hump in the bottom of the tray, as viewed from above, and parallel to the axes of the magnetic brush units. In this embodiment of the toner unit, the sleeves of the magnetic brush units are preferably rotated in the same direction, while the magnetic stirrer cylinder is provided with means for rotating it in the opposite direction and is rotated in that direction when the unit is in use. The rotation of this magnetic stirrer cylinder causes the toner mix within the tray of the unit to move in the direction that the lower peripheries of the sleeves of the magnetic brush units are moving with a resultant mixing of the material which falls from the sleeves upon the disruption of the magnetic brushes with the body of the toner mixture within the tray.

The tray of the toner unit of this apparatus has a partition extending downwardly from its top which is parallel to the axis of the magnetic brush unit or units and adjacent thereto. The lower edge of this partition is above a bottom surface of the tray leaving a slot which opens into the section of the tray which carries the magnetic brush units and agitators. A cylindrical member which carries longitudinal slots or grooves on its surface is located adjacent this slot in a position which substantially closes the slot. This partition and the grooved cylinder form a compartment for toner or a toner mix which carries a toner content higher than that normally contained in the adjacent compartment in which the magnetic brush units are located. The rotation of the grooved cylinder will convey the toner powder or enriched toner mix from this compartment into the adjacent compartment in which the magnetic brush units operate. Thus, this grooved cylinder is adapted to function as a feeding and metering device for the replenishment of toner from the toner mix in the adjacent compartment by the magnetic brushes. This grooved cylinder will be referred to hereinafter as the "toner feed cylinder" and the compartment from which it feeds toner or an enriched toner mix will be referred to as the "toner supply compartment."

This toner feed cylinder is provided with a means for its rotation at periodic intervals to replenish the toner in the adjacent compartment as it is depleted. This means for the rotation of the toner feed cylinder is controlled by the electrical system of the unit to feed toner at intervals determined by the number of copies which have been toned. Thus, it may be activated by the electrical system to feed an increasement of toner each time ten copies have been toned. This electrical control includes a series of switches or alternatively, a multiple contact rotary switch located at a position convenient to the operator of the apparatus by which the periodicity of the operation of the toner feed cylinder can be determined. By the operation of these switches or the rotary switch, as the case may be, the operator of the apparatus may cause the toner feed cylinder to furnish an increasement of toner to the toner mix after, for example, the toning of ten copies, twenty copies, fifty copies, etc.

The periodicity with which the toner is replenished to the toner mix in the operation of the apparatus is determined by the density of the image which is being toned. An image which is relatively light, i.e., has a relatively small proportion of surface which accepts toner from the magnetic toner brush depletes the toner at a slower rate than one which has massive dark areas. In the toning of the latter type of image, the toner is replenished more frequently than in the case of the former.

This mechanism for periodically replenishing the toner in the toner mix is an important feature of this apparatus in that it makes possible the continuous production of copies of substantially uniform density. Stated in another way, it avoids any progressive lightening of the copies resulting from the progressive depletion of the toner from the toner mix.

The toner unit and its means for the rotation of the sleeves of its magnetic brush units, its agitators, and its toner feed cylinder form a self-contained unit which can be displaced laterally from its normal operating position to bring it outside the cabinet of the apparatus in which it is used or completely removed therefrom to permit the replenishment of the toner or the enriched toner mix. This is a valuable feature of this apparatus in that it permits the convenient replenishment of the toner outside the cabinet of the apparatus.

The fact that the toner unit is a self-contained unit which is readily removable from the apparatus is an advantageous feature from two additional standpoints. In the event that the unit requires repair, a duplicate unit can be inserted in the apparatus and the operation of the apparatus continued without waiting for the completion of the repairs on the original unit. Again, when it is desired to change the toner being used, either the color or the polarity thereof, the toner unit as whole can be readily changed, thereby avoiding the necessity to clean a single unit between changes of toner mix.

A means for vibrating the back of the photoelectrostatic sheet after it has passed in contact with the magnetic toning brushes is located above the toner tray in a position forwardly of the magnetic brush unit or of the last magnetic brush unit, as the case may be, in the direction of travel of the sheet. In a preferred embodiment of this apparatus, the vibrator is a cylindrical brush which is provided with a means for its rotation around its horizontal axis which is at right angles to the direction of travel of the sheet. This brush is in contact with the back of the sheet as it is carried forwardly by a conveyor system. Its purpose is to cause any magnetic particles from the toner brush which are mechanically adhering to the face of the sheet to drop back into the toner tray. This vibratory action does not cause the particles of the toner itself to drop off of the image areas of the sheet since they are held in place by electrostatic force.

A shoe for each of the toner brush units of the toner unit is located above the toner brush unit in a position to contact the back of the photoelectrostatic sheet as its face surface is in contact with the magnetic brush formed by the brush unit. This shoe holds a photoelectrostatic sheet carried by the conveyor system in uniform contact with the magnetic brush as it passes over it. This shoe is electrically insulated from the toner unit and is grounded through a relay switch. The toner unit itself is electrically insulated from the remainder of the apparatus and is electrically connected to a source of direct current which gives it a bias potential with respect to the electrostatic image on the face of the photoelectrostatic sheet. The electrostatic image is negative in charge. The bias potential supplied to the toner unit may be either positive or negative in charge as may be desired. A positive charge on the toner unit increases the pickup of toner by the surface of the photoelectrostatic sheet and intensifies the visual image produced by the toning. However, it also tends to cause the background areas of the image to pick up toner causing the finished copy to have a dirty apperance. Despite the tendency of a negative bias voltage to cause the background areas of the copy to have a dirty appearance, the use of such a bias is sometimes desirable in the reproduction of original copy which has a light image which is difficult to reproduce or which is desired in a copy of increased density. Generally, it is desirable to supply a negative bias potential to the toner unit which is smaller in potential than the electrostatic charge of the electrostatic image since such a bias has a relatively small effect on the density of the toned image, and which minimizes the pickup of toner particles by the background areas of the image. The net effect of a negative bias voltage is to cause the finished copy to be clean and crisp in appearance. This net effect is desirable when reproducing original copy which is even reasonably good.

The shoes above the toner brush units are desirably longer than the width of the photoelectrostatic sheet which is toned. The combination of shoes which are of a length which extend at least to the edges of the sheet being toned and, preferably, somewhat beyond those edges with the use of a magnetic toning brush which has a length equal to the width of the latent electrostatic image which is toned is advantageous in keeping the side margins of the finished copy clean in appearance. The magnetic brush does not bring toner in contact with these marginal areas to be picked up by any residual, negative electrostatic charge they may carry and the negative bias voltage tends to restrain the positive toner from those areas. The result is that the marginal areas can pick up little or no residual toner to give them a dirty appearance.

The bias voltage on the toner unit is applied only during the interval during which a photoelectrostatic sheet is passing over the toner unit. As noted hereinbefore, the electrical circuit which grounds the shoe or shoes of this toner unit carries a relay switch. This relay switch is accurately timed in its operation by the electrical control system of the apparatus as will be fully described hereinafter to close as the leading edge of a sheet comes over the magnetic toning unit and to open the instant that the trailing end of the sheet passes the unit. When this relay switch is in open position, no bias potential is applied to the unit. It is important that its closing and opening be accurately synchronzed with the passage of a sheet over the toning unit since the application of this bias voltage when a sheet is not between the shoe or shoes of the toning unit and the magnetic brush or brushes, as the case may be, will create a short circuit in the unit.

The toning apparatus in accordance with this invention has been generally described and some of its advantageous features pointed out in the foregoing. A specific embodiment of this apparatus will now be described with reference to the accompanying drawings in which like reference characters are used to refer to like parts wherever they may occur. In the drawings.

Figure 5:
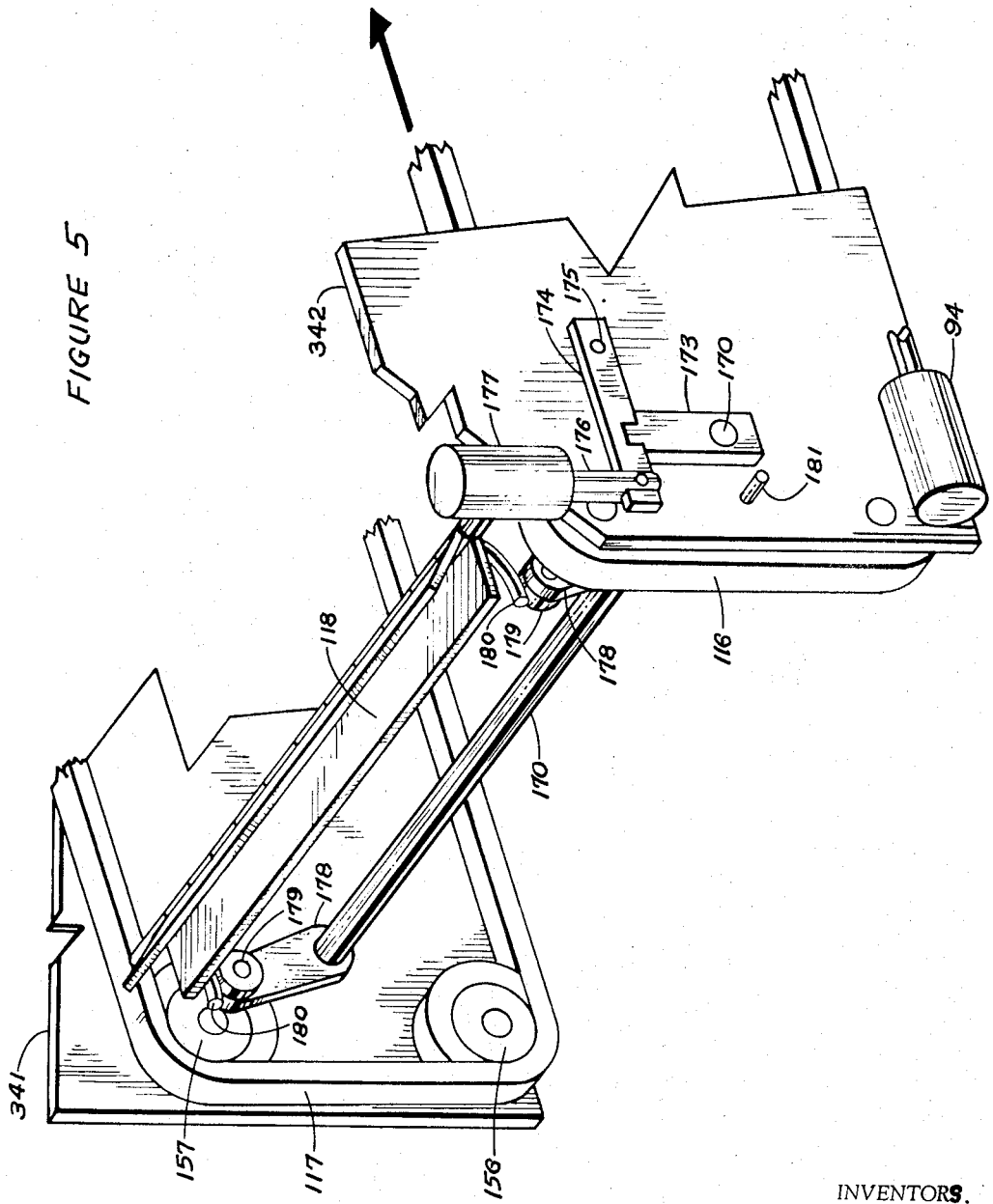
Figure 6:
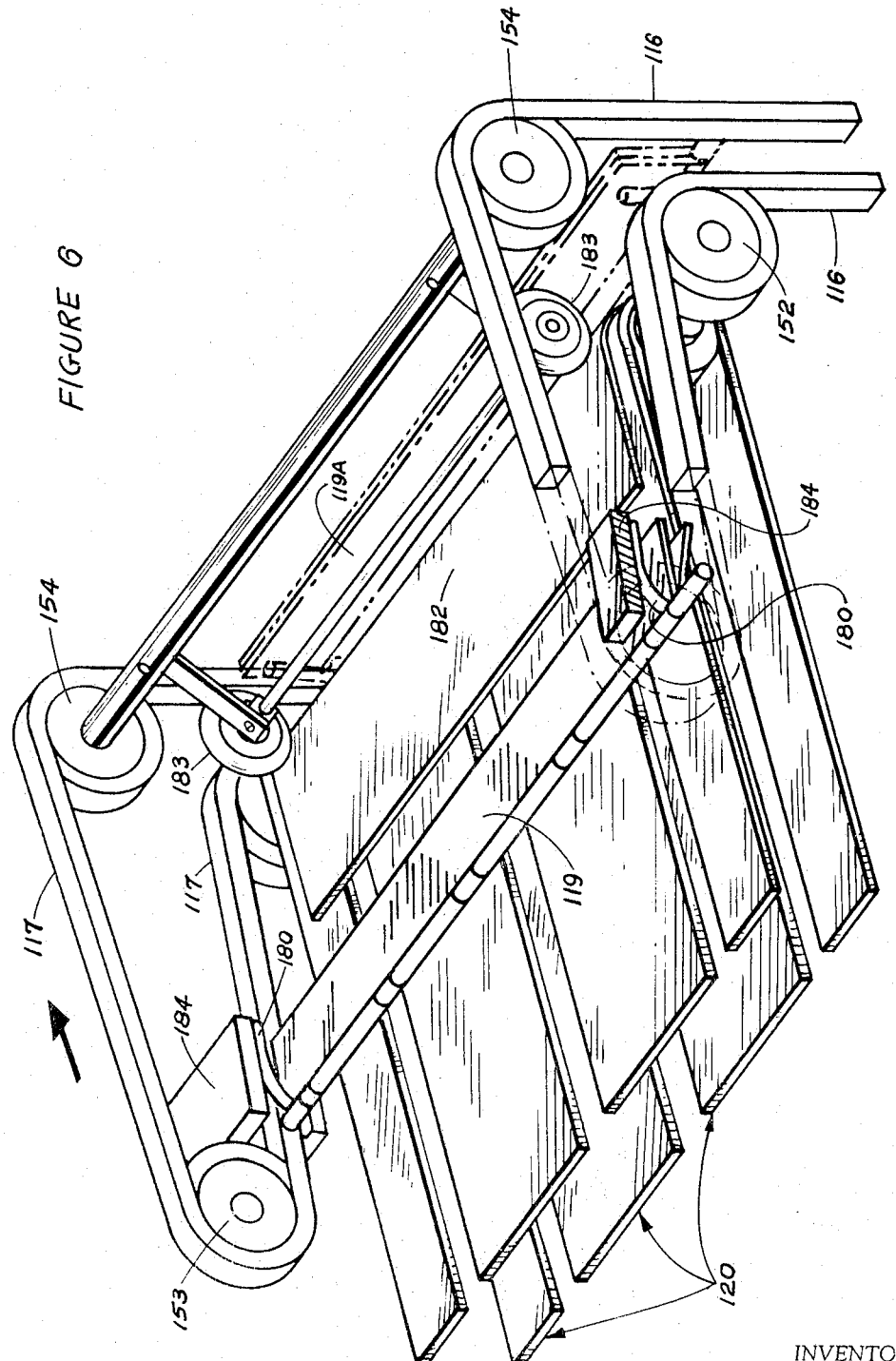
Figure 7:
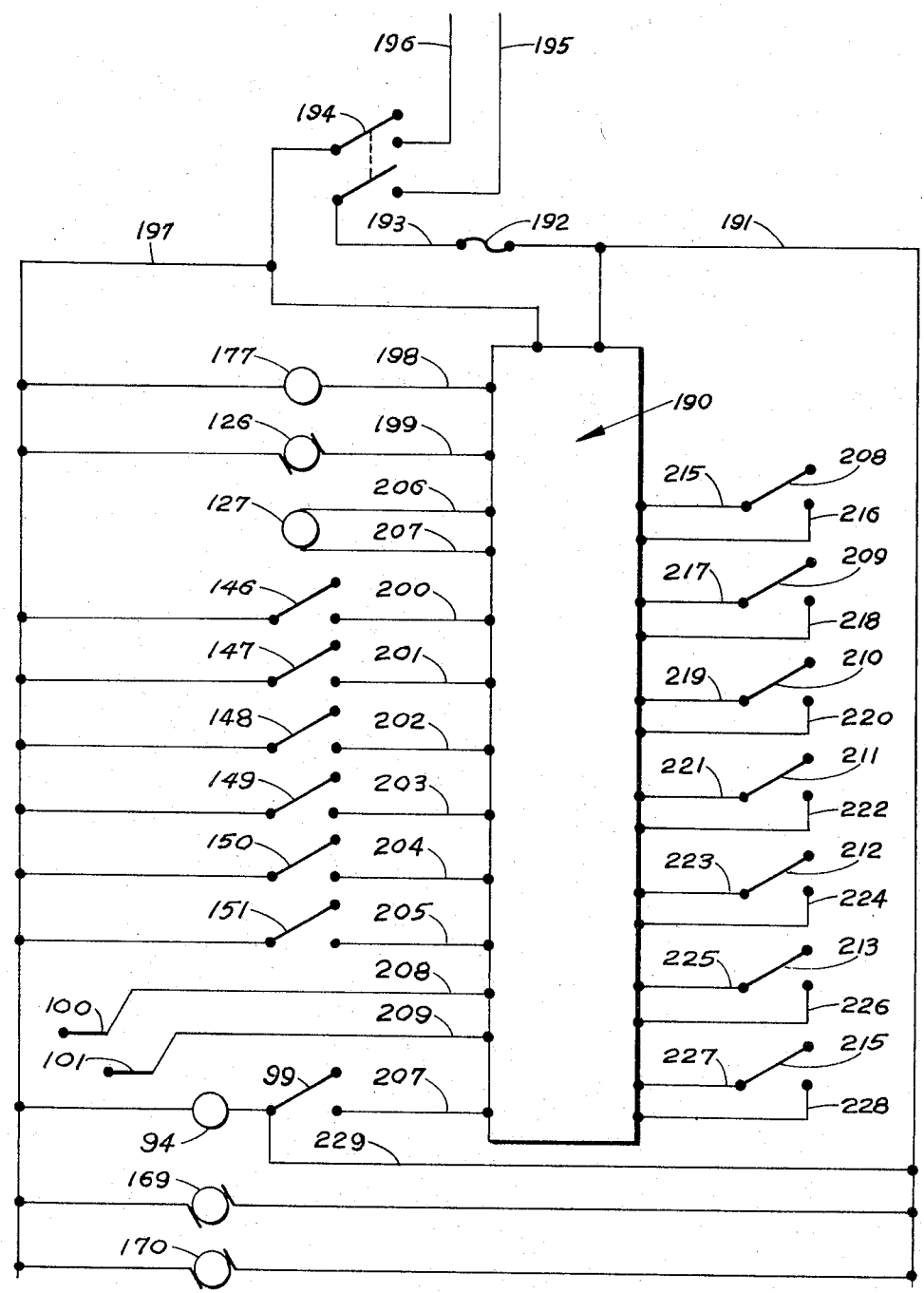

FIGURE 5 is a fragmentary, perspective view of the receiving end of the first section of the conveyor system adjacent the vacuum platen of the apparatus described by our copending application, Ser. No. 189,758, filed Apr. 24, 1962, showing a gripper in open position and the details for opening and closing the two grippers of the first section of the conveyor system in the position in which they receive a copy sheet from the vacuum platen of the apparatus;

FIGURE 6 is a fragmentary, perspective view of the delivery end of the first section of the conveyor system and of the receiving end of the second section thereof of the apparatus described by our copending application, Ser. No. 189,758, filed Apr. 24, 1962, showing a gripper in open position after delivering a copy sheet to the second section of the conveyor system; and FIGURE 7 is an electrical wiring diagram showing the electrical circuits which control the toner unit illustrated by FIGURES 1, 2 and 3.

Figure 1:
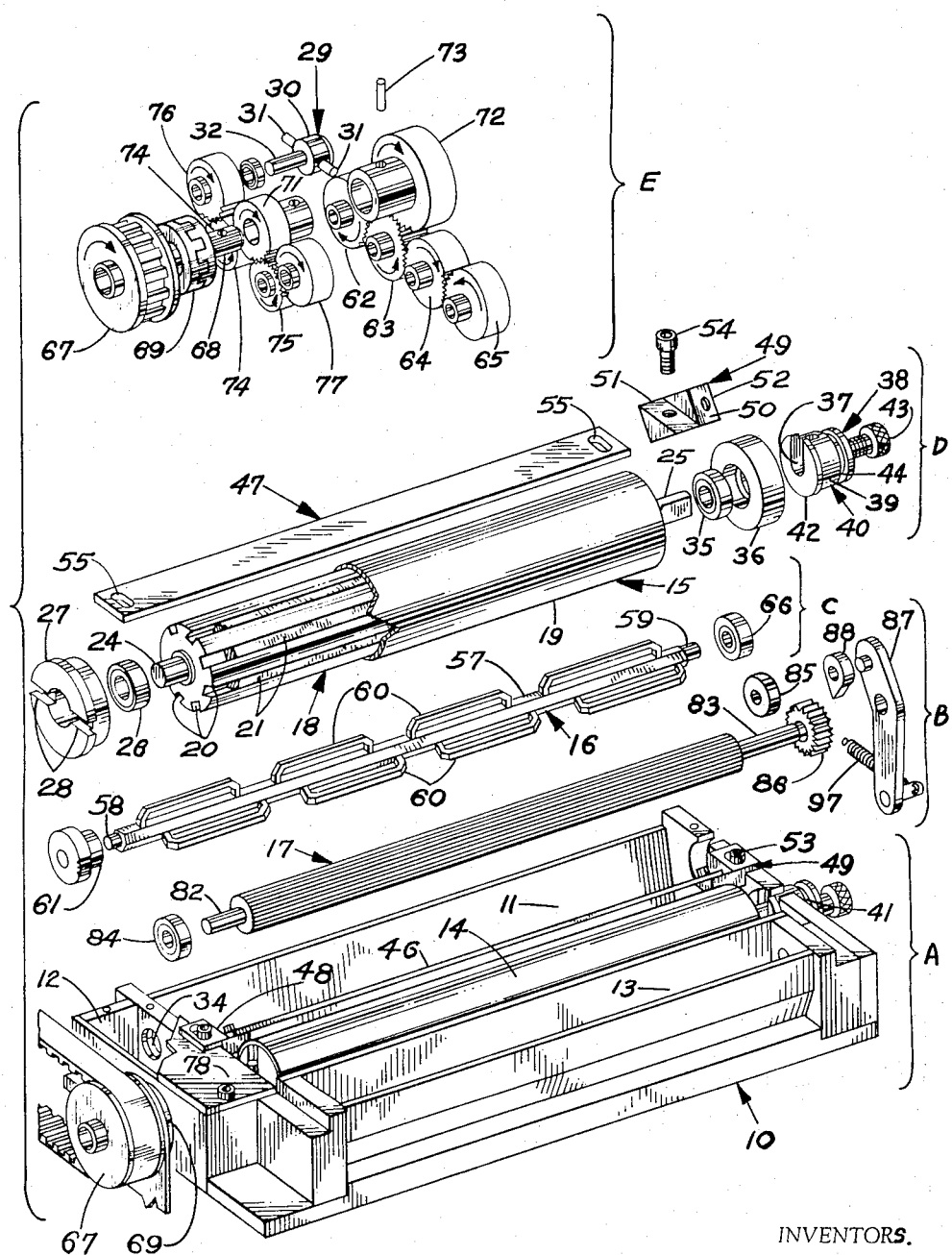
FIGURE 1 is an exploded, perspective view of the toner unit in accordance with this invention showing the relationship between its components.
Figure 3:
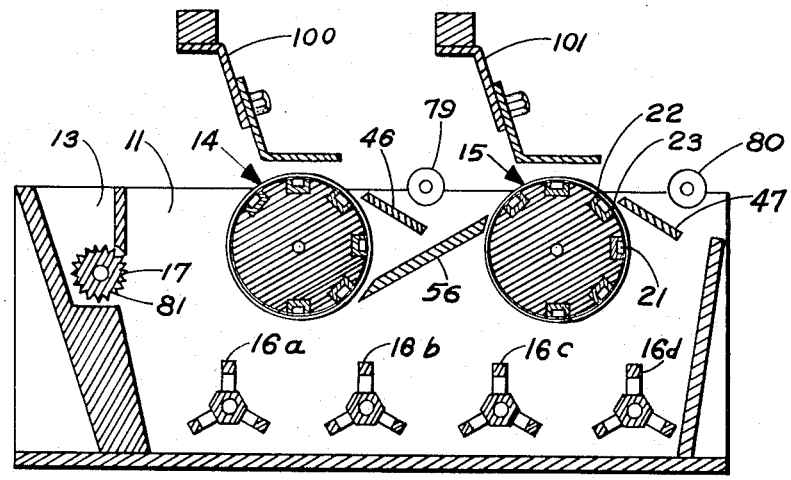
FIGURE 3 is a cross-sectional view of the toner unit illustrated by FIGURE 1 and of the cooperating shoes associated therewith.
Figure 2:
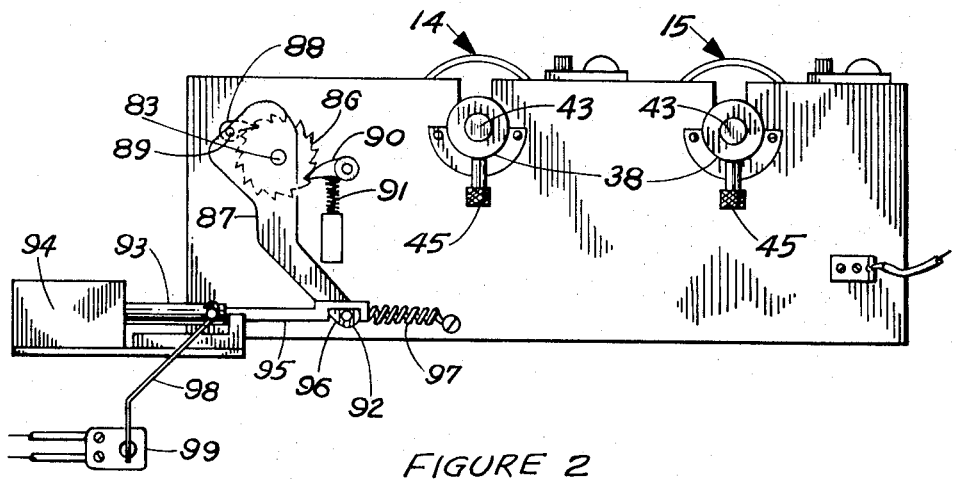
FIGURE 2 is an elevational view of the end of the toner unit illustrated by FIGURE 1 showing the means for adjusting and locking its magnetic cores in position.

Referring specifically to FIGURES 1, 2 and 3, it will be seen that this toner unit comprises a tray 10 which is divided into three compartments 11, 12 and 13. The compartment 11 carries the magnetic toner rolls 14 and 15, the details of one of which are shown by FIGURE 1-D, and four toner mixers 16—16, the details of one of which are shown by FIGURE 1-C. As best shown by FIGURE 3, the compartment 13 carries the toner feed roll 17, which forms a seal between that compartment and compartment 11 when at rest. The details of this toner feed roll 17 are shown by FIGURE 1-B. The compartment 12 carries the gear train, illustrated by FIGURE 1-E, which operates the two magnetic toner rolls 14, 15 and the four toner mixers 16—16.

The magnetic toner rolls 14, 15 are identical in design and are rotated in the same directions. Referring specifically to FIGURE 1-D, it will be seen that the roll 14 or 15 comprises a stationary cylindrical core 18 and a rotatable outer shell 19. The cylindrical core 18 is made of a non-magnetic material such as, for example, brass, and has a series of six longitudinal grooves 20—20 cut into its cylindrical surface at equally spaced intervals around approximately two-thirds of its total circumference. These longitudinal grooves carry permanent plastic magnet strips 21—21. The cross-sections of these plastic magnets are illustrated by FIGURE 3 from which it will be seen that it is, in effect, a longitudinal horseshoe magnet with its north pole 22 along one of its upper margins, and its south pole 23 along the opposite upper margin. As shown by FIGURE 1, the permanent magnet strips 21—21 do not extend to the ends of the cylindrical core 18. The lengths of these permanent magnet strips are the width of the latent electrostatic image which is to be toned by the magnetic brush unit.

The core 18 of this magnetic toner unit has coaxial shaft ends 24 and 25 as shown by FIGURE 1-D. The shaft end 24 is cylindrical and is carried by the bearing collar 26 in which it is free to rotate. The collar 26 is, in turn, carried by the concentric collar 27, the outer surface of which carries the keyways 28, 28. The collar 27 is fitted into the end of the outer cylinder 19 with a tight slip fit and is attached thereto by set screws not shown by the drawings. The inner surface of the collar 27 is adjacent the end of the core 18 which carries the shaft end 24.

Referring specifically to FIGURE 1-E, the member 29 has a cylindrical section 30 carrying keys 31, 31 and a shaft section 32. This cylindrical section 30 fits into the concentric opening of the collar 27 with the keys 31, 31 in the keyways 28, 28. The cylindrical shaft section 32 is carried by the bearing collar 33 which is within the perforation 34 in the wall of the compartment 11. The end of the shaft section 32 is within the gear compartment 12 of the toner unit and is connected to the gear train of the unit as will be fully described hereinafter.

The shaft end 25 has a short, cylindrical section directly adjacent the end of the core 18 which carries the bearing collar 35 which, in turn, carries the concentric collar 36 which is fitted into the end of the outer cylinder 19 with a tight slip fit and attached thereto by set screws.

The shaft end 25 has an outer flat sided section which is fitted into the channel 37 of the shaft adjuster designated generally by the numeral 38. The cylindrical section 39 of the member 40 of the shaft adjuster unit 38 is carried by the semi-circular perforation 41 in the wall of compartment 11 with its rim section 42 in the compartment in a position to bear against the inner edge of the perforation 41.

The member 40 of the shaft adjuster unit 38 has a threaded, coaxial perforation which carries the thumb screw 43, which has a centered point on a conical, inner end which centers itself in a centered, conical depression in the end of the shaft section 25. This thumb screw aligns the surface of the outer cylinder with the remainder of the toner unit.

The cylindrical surface of section 39 of the shaft adjuster member 40 has a groove 44 near its outer end which is outside the wall of compartment 11. This groove receives the end of the set screw 45 which can be seen by reference to FIGURE 2. This set screw locks the shaft adjuster unit in any desired rotational position within the perforation 41 of the wall of compartment 11. The adjustment of the rotational position of the shaft adjuster unit 38 determines the rotational position of the shaft end 25 and of the core cylinder 18 with respect to the toner unit as a whole.

The adjustability of the rotational position of the core 18 and of the plastic magnets 21—21 which it carries is an important feature of this toner unit in that it enables maximum efficiency to be obtained in the application of toner to a latent electrostatic image carried by a photoelectrostatic sheet passed over the toner unit by a conveyor system of the apparatus. The adjustment of the position of the core 18 to obtain maximum efficiency in the toning operation is made on the basis of trial and error. Although theories can be advanced on the basis that the positions of the north pole and the south pole edges of the plastic magnets should be in specific positions relative to the tangential path of travel of the photoelectrostatic sheet carrying the electrostatic image being toned, the trial and error adjustment is the simplest and most direct means for obtaining maximum efficiency in the toning operation.

As best shown by FIGURE 3, each of the two magnetic toner rolls 14 and 15 are, respectively, provided with the doctor blades designated generally by the numerals 46 and 47. The details of these doctor blades are identical and are shown by FIGURE 1-D for doctor blades 47. Referring specifically to FIGURE 1-D, it will be seen that the blade 47 is provided with end brackets, one of which is the mirror image of the other. The end bracket 49 is shown by FIGURE 1-D. Each of these end brackets is provided with two surfaces 50 and 51 which are at an angle of approximately forty-five degrees to each other. The section of the bracket forming surface 50 is provided with an oval perforation 52 through which the screw 53 passes to adjustably attach the bracket 49 to the top of the side wall of compartment 11 of the toner unit. The angled surface 51 is tapped to receive the screw 54 by which the end of the blade 47 is adjustably attached to the surface 51 through the oval perforation 55 near the end of the blade.

The screws 53, 53 and 54, 54 permit the edge of the blade 47 to be accurately adjusted to parallel the cylindrical surface of the shell 19 of the toner roll with a clearance which determines the height of the magnetic brush which comes into contact with the electrostatic image on a photoelectrostatic sheet. The edges of the doctor blades 46, 47 are below the horizontal tangent passing through the upper end of the vertical diameters of the magnetic toner units. The excess toner mix which is removed by the action of the doctor blades 46, 47 falls back into the toner mix tray.

Referring specifically to FIGURE 3, it will be seen that the angulated plate member 56 is located between the magnetic toner rolls 14 and 15 in a position such that its upper surface receives the toner mix falling from the surface of the shell 19 of the roll 15 adjacent the part of its core 18 which carries no magnets to retain the toner mix as a magnetic brush. This member 56 causes the toner mix dropped by the toner unit to fall into the toner mix in the bottom of the compartment 11 at a location such that it cannot be immediately picked up by the roll 15 without being admixed with the body of the toner mix in the bottom of that compartment.

The four mechanical stirrers 16a, 16b, 16c, 16d near the bottom of the compartment 11 and below the magnetic toner rolls 14 and 15 agitate and mix the toner mix in the bottom of the compartment 11. The stirrers 16a and 16c are rotated by the gear train in clockwise direction, while the stirrers 16b and 16d, like the shells of the magnetic toner rolls 14, 15, are rotated in the reverse direction.

The mechanical stirrers 16—16 are identical in construction the details of one of which are illustrated by FIGURE 1–C. The mechanical stirrer 16 comprises a rod 57 which is generally hexagonal in cross-section with cylindrical end sections 58, 59. The alternate surfaces of the hexagonal section of the rod 57 each carry four elongated loops 60—60 which are spaced apart along each surface. The loops on the alternating surfaces around the rod are in stepped positions with respect to the length of the rod.

The cylindrical end section 58 of the rod 57 passes through a bearing 61 carried by the wall of compartment 11 and extends into the compartment 12 carrying the gear train of the unit. The end of section 58 of the stirrer 16a is attached to the gear 62 of FIGURE 1–E which is located within compartment 12. The corresponding ends of the stirrers 16b, 16c and 16d, respectively, carry the gears 63, 64 and 65.

Referring again to FIGURE 1–C, the end section 59 of the stirrer 16 is carried by the bearing 66 which is located in a perforation in the wall of compartment 11 opposite that through which it carries the end section 58.

FIGURE 1–E illustrates the gear train by which the shells 19, 19 of the magnetic toner rolls 14 and 15 and the mechanical stirrers 16a, 16b, 16c and 16d are driven. The main drive sprocket 67 of this train is outside the wall of compartment 12, as shown by FIGURE 1–A, while the remainder of that gear train is within that compartment. The shaft 68 is detachably connected to the sprocket 67 by a self-centering, multi-jaw coupling 69. One of the two elements of this coupling 69 is attached to the sprocket 67, while the other is attached to the end of the shaft 68. This coupling 69 is located outside the wall of compartment 12. The shaft 68 is carried by a bearing in the wall of compartment 12.

The coupling 69 is disconnected by a movement of the toner unit away from the sprocket 67. This coupling permits the toner unit to be pulled partially or wholly out of the cabinet of the apparatus in which the toner unit is located through the door 70 for the replenishment of toner in its compartment 13 for servicing or for the substitution of a duplicate unit. This is an advantageous feature of this apparatus both from the standpoint of the convenience in the replenishment of the toner and the ease with which the toner unit can be replaced with a duplicate unit.

Referring specifically to FIGURE 1–E, the shaft 68 carries the gears 71 and 72 which are keyed together by the pin 73. The gear 72 meshes with the gear 63 which, in turn, meshes on one side with the gear 62 and on the other with gear 64. The gear 64, in turn, meshes with gear 65. As shown by the arrows of FIGURE 1–E, this meshing of the gears causes gears 62 and 64 to rotate in the opposite direction. As already noted, the gears 62, 63, 64 and 65 are, respectively, carried by the shaft ends of the stirrers 16a, 16b, 16c, and 16d respectively.

Still referring to FIGURE 1–E, the gear 71 is the main drive for the shells 19, 19 of the magnetic toner rolls 14 and 15. The gear 71 meshes with the gears 74 and 75 which are idler gears and, respectively, mesh with gears 76 and 77 which drive the shells of magnetic toner rolls 14 and 15 through key members 29. Each of the gears 76 and 77 is attached to the shaft sections 32, 32 of the key members 29, 29 which are, in turn, keyed to the shells 19, 19 of the magnetic toner rolls 14 and 15 as described hereinbefore with reference to FIGURE 1–D. The top of the compartment 12 carrying the gear train is closed by a cover 78 to protect the gear train from foreign matter.

The brackets 48 and 49 of the doctor blades 46 and 47 also carry the ends of the axles of the nylon rollers 79 and 80, shown by FIGURE 3, which extend longitudinally above the upper surfaces of the blades 46 and 47. The position of these nylon rollers with respect to the doctor blades 46 and 47 is best shown by FIGURE 3. The rollers 79 and 80 are insulating idlers which prevent the trailing end of a photoelectrostatic sheet being carried over the toner unit from dragging over the surface of the blades 46 and 47 and interrupting the downwardly flow of the toner mix over their upper surface.

The toner mix feed roll 17 extends across the toner mix feed compartment 13 adjacent the longitudinal slot 81 along the bottom of the compartment 13 as can best be seen by reference to the cross-sectional view of the toner unit shown by FIGURE 3. The toner mix feed roll 17 has a generally cylindrical surface which carries longitudinal grooves or serrations. When at rest, this toner mix feed roll substantially seals the slot 81, but due to its serrations, when rotated transfers an enriched toner mix or toner powder from the compartment 13 to the compartment 11 carrying the magnetic toning rolls 14 and 15.

The roll 17 is provided with cylindrical shaft ends 82 and 83. The shaft end 82 is carried by the bearing 84 in the side wall of the compartment 13 while the shaft end 83 is carried by the bearing 85 in the opposite side wall of the compartment 13 and extends through the bearing 85 to position a stub section outside that wall of compartment 13.

Referring specifically to FIGURE 2, it will be seen that the outer end of the shaft end 83 carries the rachet wheel 86 which is keyed thereto and the rachet arm 87 which is pivotally mounted thereon. The upper portion of the rachet arm 87 carries a spring loaded, pivotally mounted, rachet pawl 88 the edge of which bears on the rachet wheel 86. The pivot 89 carrying the rachet pawl is located on the rachet arm 87 with respect to the end of the shaft end 83 which carries the rachet arm in a position such that when the lower end of the lever is moved laterally, shown as being to the left of FIGURE 2, the edge of the pawl engages the rachet wheel causing it to rotate a minor fraction of its total circumference. This rotation of the rachet wheel 86 by the action of the rachet arm 87 causes a corresponding rotation of the toner mix feed roll which delivers an increasement of enriched toner mix or toner powder contained in compartment 13 to a body of toner mix carried by compartment 11 after each second such successive movement.

The rachet wheel 86 has a second pawl 90 having an edge bearing on its teeth. This pawl is loaded with a spring 91 which holds its edge against the rachet wheel 86 and permits the edge to ride over the teeth as the rachet wheel is rotated forwardly by the rachet arm 87 and the pawl 83 but prevents the rachet wheel from rotating in the reverse direction when the pawl 83 is drawn backwardly.

The lower end of the rachet arm 87 carries a pin 92 which is attached to the core 93 of the solenoid 94 by the hook 95. The hook 95 is attached at one end to the end of the solenoid core 93 by a pivot and at the other end to the pin 92 by the channel 96 near its opposite end. This channel 96 can be removed from the pin 92 and the hook 95 is pivoted to get it out of the way when it is desired to remove the toner unit from the apparatus. The lower end of the rachet arm 87 is attached to the spring 97 which exerts tension which tends to pull the bottom of the lever in the direction to the right as illustrated by FIGURE 3 which causes the pawl 83 to move backwardly over the rachet wheel 86.

When the solenoid 94 is energized, it retracts its core 93 which pulls the lower end of the rachet arm to the left as shown by FIGURE 3 in the direction which causes the pawl 83 to move the rachet wheel 86 in a forwardly direction and, thereby, feed an increasement of enriched toner mix or toner powder from compartment 13 to compartment 11. The solenoid 94 is energized by the electrical system of the apparatus as will be fully described hereinafter.

The solenoid core 93 operates against the tension of the spring 97 as it is retracted. Upon reaching its fully retracted position, the solenoid 94 is de-energized by the operation of the rod 98 connecting the outer end of the solenoid core and the switch 99 of the electrical system described hereinafter. When the solenoid is de-energized, the spring 97 returns the solenoid core to its extended position, the bottom of the rachet arm to its original position, and places the pawl 88 in position again to move the rachet wheel 86 forwardly to feed another increasement of enriched toner mixture or toner powder. As already noted, the pawl 90 holds the rachet wheel 86 against the backwardly movement of the pawl 88.

Referring again to FIGURE 3, it will be seen that the shoes 100 and 101 are, respectively, positioned above the magnetic toner rolls 14 and 15. These shoes 100 and 101 serve two functions. First, the back of a photoelectrostatic sheet being carried over the magnetic toner rolls 14 and 15 by a conveyor system passes in contact with the lower section of these shoes which hold the reverse surface in contact with the magnetic brushes of the toner rolls 14, 15 to permit a uniform toning of the electrostatic image carried by that surface. Second, these shoes provide a ground contact for the application of a bias voltage applied by the operation of the electrical system of the apparatus.

Figure 4:
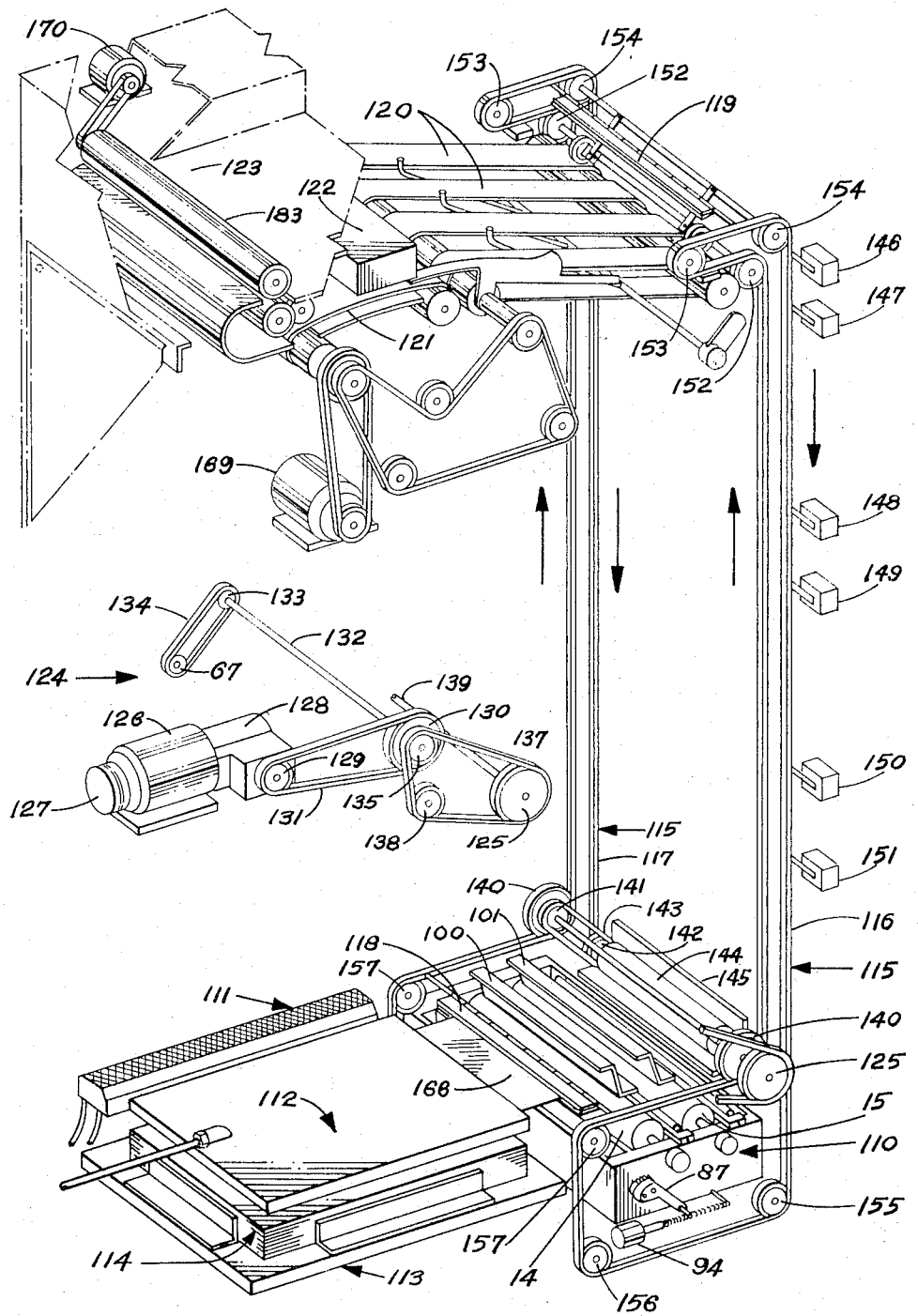
FIGURE 4 is a partially exploded perspective view of the conveyor system, of the vacuum platen in its offset position, of the toner unit and of the fuser unit of the apparatus described and claimed by our copending application, Ser. No. 189,758, filed Apr. 24, 1962, which illustrates the relationship of the toner unit of this invention to the related units in that particular apparatus.

FIGURE 4 illustrates the relationship of the toner unit in accordance with this invention to related units of the automatic apparatus for photoelectrostatic reproduction described and claimed in our copending application Ser. No. 189,758 filed Apr. 24, 1962, now Patent No. 3,180,-239. This toner unit is well adapted for use as an essential component of the automatic apparatus described by that application. However, as already noted, it is equally well adapted for use in any apparatus for photoelectrostatic reproduction which develops a latent electrostatic image by the use of a powdered solid resinous toner.

Referring specifically to FIGURE 4, the numeral 110 generally designates the toner unit described in detail hereinbefore with reference to FIGURES 1, 2 and 3. Adjacent to this toner unit 110 and on approximately the same horizontal level are the corona discharge unit 111, the vacuum platen 112, the carrier plate 113 forming a part of the sheet feeding unit of the apparatus, and a stack of photoelectrostatic sheets 114 on the carrier plate 113.

The first section 115 of the conveyor system of the apparatus consisting of two parallel belts or chains 116 and 117 which travel in parallel vertical planes and, respectively, pass adjacent the ends of the toner unit 110 then upwardly and finally at a slight angle to a horizontal plane for a short distance. The chains 116 and 117 carry two sheet grippers 118 and 119 which are, respectively, adapted to grasp a sheet carried by the vacuum platen when it is in a laterally displaced position as illustrated by FIGURE 4, carried over and in contact with the magnetic brushes of the toner rolls 14 and 15 of the toner unit 110 and under its bias shoes 100 and 101 with the latent electrostatic image which it carries facing downwardly. This unit 110 applies a powdered solid toner to its latent electrostatic image on the surface of the sheet. The sheet grippers 118 and 119 are apart on the belts or chains 116 and 117 by one-half the equal lengths of the two belts or chains.

The second section 120 of the conveyor system comprises a plurality of belts and extends from the upper end of the first section 115 along a slightly inclined plane to the third section 121 of the system. The second section 120 of the conveyor system is adapted to receive and transport a sheet released by the sheet gripper 118 or 119 to the third section of the conveyor system. The fuser unit 122 is located above the third section 121 of the conveyor system. This third section 121 carries the photoelectrostatic sheet under the fuser unit 122 with its toned image facing upwardly to fuse the toner powder and make the image permanent. This third section of the conveyor then carries the sheet upwardly and delivers it to the delivery station 123 of the apparatus.

The drive for this first section of the conveyor system and for the toner unit 110 is illustrated by FIGURE 4 as a broken away unit designated generally by the numeral 124. It will be noted that the broken away unit duplicates the showing of the drive sprocket 125 which fixes the position of this unit relative to the remainder of the conveyor system. It consists of an electric motor 126 provided with an electrically activated brake 127 and a speed reducer 128 which drives sprocket 129. Sprocket 129 drives sprocket 130 through the chain 131. The sprocket 130 is on one end of the axle 132, the other end of which carries the sprocket 133 which drives sprocket 67 through the electrically insulating timing belt 134 which carries teeth which positively engage the teeth of sprockets 133 and 67. The belt 134 may, for example, be made of rubber. It serves to insulate the toner unit 110 from the remainder of the drive mechanism of the conveyor system. The sprocket 67 is the main drive for the toner unit 110. The axle 132 carries a third sprocket 6 adjacent sprocket 130, which drives sprocket 125 through chain 137 which passes around the idler sprocket 138.

As shown by FIGURE 4, the sprocket 125 is affixed to the end of the axle 139 which carries the sprockets 140, 140 which drive the conveyor transport chains 116, 117 of the first section of this conveyor system. The axle 139 carries a fourth sprocket 141 which drives sprocket 142 through chain 143. The sprocket 142 is affixed to the end of an axle which carries a vibrator 144. The vibrator 144 may, for example, be a brush with bristles which extend through the slots in the adjacent sweep 145. The rotation of this brush vibrator 144 vibrates the back of a copy sheet passing around the opposite side of the sweep 145 and causes any mechanically adhering particles of iron from the toner mix to drop from the surface of the sheet.

The revolving brush vibrator described in the foregoing is only one of several forms of vibrators which are suitable for use in this apparatus. An alternative form, which may be positioned above the upper edge of the sweep 145 is a rotating bar having an irregular surface which contacts the back of a sheet of copy paper just after it has passed around the sweep and causes the sheet to vibrate.

Referring specifically to FIGURE 4, it will be noted that a series of six limit switches 146, 147, 148, 149, 150 and 151 are spaced at accurately predetermined intervals along the path of the downward or return travel of the transport chain 116. That chain carries two lugs, not shown by the drawings, which are, respectively, precisely spaced on the chain in relation to the position of the grippers 118 and 119 one end of each of which is carried by the chain. The tripping arms of each of the limit switches 146, 147, 148, 149, 150 and 151 are in a position relative to the path of travel of the adjacent chain 116 such that the lugs carried by the chain will trip the switch as they pass.

The contact between one of the lugs carried by the chain 116 and the tripping arm of the limit switch 146 cocks a relay which controls the brake 127 on the shaft of the electric motor 126 and the operation of that motor in driving the transport chains 116 and 117 as well as the sprocket 67 which is the main drive for the toner unit 110. The following contact between that lug and the tripping arm of the limit switch 147 activates the control relay which stops the motor 126 by applying the brake 127 to instantaneously stop the rotation of its shaft. The lug on the chain 116 and the tripping arm of the limit switch 147 are in exact positions to stop the motor 126 and the movement of the chains 116, 117 at the precise position which places the gripper 118 or 119 as the case may be in the position illustrated in the case of gripper 118 by FIGURE 4. The position of gripper 119 when gripper 118 is in the position also shown by FIGURE 4.

The limit switches 148, 149, 150 and 151 control the application of a bias potential to the shoes 100 and 101 of the toner unit 110 as will be described hereinafter with reference to FIGURE 5.

Still referring to FIGURE 4, as noted above, the belts or chains 116 and 117 are driven by the sprockets 140, 140, pass upwardly to pass around sprockets 152, 152; 153, 153; and 154, 154; then downwardly to pass around 155, 155; 156, 156; 157, 157; and to finally return around the drive sprockets 140, 140.

FIGURE 5 shows the end of the first section of the conveyor adjacent the vacuum platen 112 with the gripper 118 in open positions ready to receive the edge of a copy sheet 166 by the lateral displacement of the platen 112. It will be noted that FIGURE 4 shows this gripper closed over the end of the copy sheet 166. The sprockets 157, 157 and 156, 156 one of each pair of which is shown by FIGURE 5 fixes the relationship of this broken figure to that illustrated by FIGURE 4.

Referring specifically to FIGURE 5, the numeral 170 designates an axle, the ends of which are carried by the frame members 171 and 172 which are affixed to the main frame of the apparatus. One end of the axle 170 extends beyond the outer side of the frame member 172 and carries the lever arm 173. The lever 173 is held in a vertical position by having an end section in a notch in the lower edge of the lever arm 174. One end of the lever arm 174 is pivoted on a pin 175 attached to the frame member 172 and the other end is attached to the end of the core 176 of the solenoid 177 by a pivot joint.

The axle 170 carries two arms 178, 178 which have rollers 179, 179 positioned to bear on the arcuate lever arms 180, 180 of the gripper 118 and to force them upwardly when the lever 173 is held in position by the lever arm 174. The lever arms 180, 180 of the gripper are attached to the upper leaf thereof, and when forced upwardly, cause the gripper to open as illustrated by FIGURE 5. As shown by FIGURE 5, the arms 178, 178 are in an inclined position when they are held in position to open the gripper 118.

The activation of the solenoid 177 causes it to raise the end of the lever arm 174 freeing the axle 170 to rotate a fraction of a turn in the counterclockwise direction. This rotation of the axle 170 is caused by the weight of the arms 178, 178 and the rollers 179, 179 causing the arms to fall from their inclined position. The rotation of the axle 170 is stopped by the lever arm 178 coming to rest against the pin 181. This rotation removes the rollers 179, 179 from their contact with the levers 180, 180 and permits the gripper 118 to close under tension provided by a spring in its hinge. The solenoid 177 is activated by the electrical control system to cause the gripper 118 to close at the instant that the vacuum platen 112 reaches its laterally displaced position placing the edge of a copy sheet in position to be grasped by the gripper.

The pin 181 is in a location such that when the lever arm 173 is resting against it, the cam rollers 179, 179 are in the path of travel of the gripper lever arms 180, 180. As the gripper 118 moves into the position shown by FIGURE 5, the lever arms 180, 180 bring the arms 178, 178 and the axle 170 to the position shown by FIGURE 5 and causes the lever arm 173 to become locked in its vertical position by the lever arm 174. In this position, the leaves of gripper 118 are held in their open position as shown by FIGURE 5.

It is essential that gripper 118 come to an accurately positioned stop in the position in which it is illustrated in FIGURE 5. This position must be accurate to permit the gripper to receive the edge of a copy sheet from the vacuum platen 112 as it comes to its laterally displaced position just prior to the end of the cycle of operations of the vacuum platen transport system. Similarly, the gripper 119 must be stopped at exactly the same location when it is, in turn, carried around by the conveyor chains to receive a copy sheet.

FIGURE 6 shows the detail of the upper or forward end of the first section of the conveyor system together with the backward end of the second section of that system and shows the gripper 119 at the instant after it has been forced into its open position to deliver a copy sheet that it is carrying to the second section 120 of the conveyor system. The gripper 118 and 119, as the case may be, is not stopped in being opened to deliver a copy sheet to the second section of the transport system, but is opened and then permitted to close under its own spring loading while the transport chains are in motion. The movement of the transport chains is stopped only when one of these grippers comes into position to receive a copy sheet as described hereinbefore.

Referring specifically to FIGURE 6, it will be seen that the copy sheet 182 is being carried by the belts of the second section of the transport system and is held on those belts by the spring loaded rollers 183, 183. The leading edge of the copy sheet has just been released by the opening of the gripper 119 in its forward travel. The gripper 119 has pulled away from the leading edge of the copy sheet 182 because the first section of the conveyor system travels at a somewhat faster rate than its second section.

The gripper 119 has been forced open by the arcuate lever arms 180, 180 riding under the surfaces of the anvil blocks forming the upper section of the element 184 which force the ends of the lever arms downwardly. The chains 116, 117 of the first section 115 of the conveyor system are riding over the shoes on the upper surface of the lower section of the element 184 which are beneath the chains at the location that the chains are placed under stress by the contact between the lever arms 180, 180 and the anvil blocks 184, 184. The shoes 185, 185 prevent this stress from causing the chain to sag, and thereby interfere with the opening of the gripper 119.

Still referring to FIGURE 6, as the gripper 119 is moved forwardly, its arcuate lever arms 180, 180 ride out from under the anvil blocks 184, 184. Upon being released from their depressed position, the arms 180 180 cease to counteract the spring tension which closes the gripper 119 and the gripper closes. The movement of the chains 116, 117 continues until they reach the approximate position shown in broken outline designated 119A at which point its return movement is stopped while the gripper 118 receives a copy sheet as described with reference to FIGURE 5.

Our copending application Ser. No. 189,758 filed Apr. 24, 1962 describes in detail an automatic electrical control circuit of an apparatus for the automatic photoelectrostatic reproduction of images of which the toner unit of this invention is adapted to form an essential part. That automatic electrical control circuit comprises a series of stepping switches and relays together with related elements. It does not form a part of this invention and will not be described in this specification. However, the relationship of the various electrical components of the apparatus of this invention to the automatic control circuit, insofar as it relates to the control of the toner unit 110, with respect to the first section 115, the second section 120 and the third section 123 of the conveyor system associated with the toner unit 110 will be described with reference to FIGURE 7. The relationship of the automatic control circuit to the toner replenishment system of the toner unit 110 will be described with reference to FIGURE 7.

Referring specfically to FIGURE 7, it will be seen that the automatic electrical control circuit is indicated generally by the numeral 190. This automatic electrical control circuit is connected by the electrical line 191 through the fuse 192 and the electrical line 191 through the fuse 192 and the electrical line 193 to the double pole starting switch 194 of the apparatus which is, in turn, connected by the line 195 to one side of a suitable source of alternating electric current which may be, for example, a 110 volt, 60 cycle current. The second terminal of the starting switch 194 is connected by the line 196 to the other side of the source of alternating current and the corresponding terminal of the switch 194 is connected to the line 197.

The line 197 is connected to one terminal of each of the winding of the solenoid 177; the electric motor 126; the limit switches 146, 147, 148, 149, 150 and 151; the electric motor 169 and the electric motor 170. The second terminals of each of the winding of the solenoid 177; the electric motor 126; the limit switches 146, 147, 148, 149, 150 and 151 are connected, respectively, by the electrical lines 198, 199, 200, 201, 202, 203, 204 and 205 to the automatic control circuit 190. The second terminals of the electric motor 169 and the electric motor 170 are each connected to the electrical line 191.

The terminals of the electric brake 127 on the motor are, respectively, connected by the electrical lines 208 and 209 to the automatic control circuit 190. The electrical control circuit 190 is also connected to the electrical line 197.

Referring both to FIGURE 7 and to FIGURE 4, the closing of the starting switch 194 activates the automatic control circuit 190 and places the electric motors 169 and 170 in operation. These motors operate continuously as long as the switch 194 is closed, i.e., as long as the apparatus as a whole is in operation. Referring again to FIGURE 4, it will be seen that the operation of the motor 169 drives the belts of the second section 120 of this conveyor system as well as the single wide belt of the third section 121 of the apparatus. The operation of the motor 170 drives the roll of the third section 121 of the system.

The electrical components of this conveyor system other than its electric motors 169 and 170 are under the direct control of the automatic control circuit 190 and are timed in their operation by the control circuit with respect to other operations of the photo-electrostatic copy apparatus of which this conveyor system is adapted to form an essential component. The cycle of operation of this conveyor system is initiated by the automatic control circuit 190 when the vacuum platen 112 of the copy apparatus completes a cycle of its operations to the point at which it returns to its displaced position adjacent the position in which it receives a copy sheet to begin its cycle of operations.

When the vacuum platen 112 reaches its displaced position, one of the sheet grippers 118 or 119 is in its open position adjacent the vacuum platen as illustrated by gripper 118 shown by FIGURE 6. The vacuum platen 112 by its lateral movement places an edge of the copy sheet which it is carrying between the leaves of the gripper in a position to be grasped by the gripper when its leaves are closed by the spring tension on its hinge.

The automatic control circuit 190 causes the gripper 118 or 119, as the case may be, to grasp the edge of a copy sheet 166 as soon as the vacuum platen 112 reaches its laterally displaced position by de-energizing the winding of the solenoid 177 which was energized at the end of a prior cycle of operation of the first section 115 of this conveyor system as will be explained hereinafter. The de-energizing of the winding of the solenoid 177 permits the rollers 179, 179 to drop away from the arcuate arms 180, 180, in turn, permitting the gripper 118 or 119 to close under the spring tension of its hinge.

After the winding of the solenoid 177 is de-energized and the gripper 118 or 119 has gripped the edge of a copy sheet 166, the automatic control circuit 190 shuts off the D.C. voltage on the brake 127 of the electric motor 126 which had been applied at the end of the preceding cycle of operation of this conveyor system. At the same time, the automatic control system energizes the motor 127 to start the transport chains or belts 116 and 117 of the first section 115 of this conveyor in motion to carry the copy sheet over the toner unit 110 and under the toner bias shoes 100 and 101 and on to the second section 120 of this conveyor system.

The energizing of the motor 126 to place the first section of the conveyor system in motion also places the outer shells 19, 19 of the toner rolls 14 and 15 in motion by the action of the sprocket 67. The rotation of these shells forms a magnetic brush on their surfaces which carry particles of a resinous toner powder. As the copy sheet 166 is carried forwardly by the gripper 118, its lower surface comes into contact with the magnetic brushes carried by the toner rolls 14 and 15 and the particles of the resinous toner adhere selectively to a latent electrostatic image carried by its surface. At the same time, the toner stirrers 16—16 are rotated by the gear train of the toner unit 110 to keep the toner mixture supplied to toner rolls 14 and 15 supplied with toner powder which is selectively removed from the magnetic brush carried by the rolls.

The automatic control 190 closes the current supply to the bias shoes 100 and 101 and readies them to supply a bias voltage to these shoes at any time the shoe 100 or 101, or both, are grounded by the operation of their associated limit switches. The movement of this first section 115 of this conveyor system causes the normally open limit switches 148 to close by contact with one of the two lugs on the transport chain 116, completing the circuit of the bias shoe 100 to ground. This bias shoe 100 remains grounded with its bias current operable until the same lug on the transport chain 116 contacts the normally closed limit switch 150, opening it, thereby causing the automatic control circuit 190 to open the circuit between the bias shoe 100 and ground.

The tripping arm of the switch 148 and the two lugs on the transport chain 116 are precisely positioned with respect to each other and with respect to the location of the grippers 118 and 119 on the transport chains 116 and 117 to cause the bias shoe 100 to become grounded at the moment the leading edge of the electrostatic image is brought under the bias shoe. The tripping arm of switch 150 and the two lugs on the transport chain are precisely positioned with respect to the location of the grippers on the transport chains 116 and 117 to cause the bias shoe 100 to be disconnected from ground at the moment the trailing edge of the copy sheet passes under the bias shoe.

The ground connection of the bias shoe 101 is established by the contact of a lug on the transport chain 116 with the tripping arm of the switch 149 in exactly the same manner described above in connection with the bias shoe 100 and the switch 148. Further, the ground connection of the bias shoe 101 is broken by the action of the switch 151 in exactly the same manner as described above in connection with the bias shoe 100 and the switch 150.

The positions of the switches 149 and 151, the positions of the lugs on the chain 115 and the positions of the grippers 118 and 119 on the chain 116 relative to the bias shoe 101 are exactly the same as those of the switches 148 and 150 relative to the position of the bias shoe 100, the lugs on the chain 116 and those of the grippers 118 and 119 on the chains 116 and 117 which have been described in the foregoing.

As can be seen by reference to FIGURE 4, the bias shoes 100 and 101 are spaced apart along the line of travel of the grippers 118 and 119. The switches 148 and 149 and the switches 150 and 151 are, respectively, spaced apart along the line of travel of the chain 116 by the same distance as the bias shoes are spaced apart. The spacing between switches 148 and 150 and between switches 149 and 151, respectively, are identical. This spacing is the same as the length of the latent electrostatic image which is toned by the toner unit 110 in the direction of its forward travel along the conveyor system of the apparatus.

The opening of the limit switch 151 by contact with one of the two lugs carried by the chain 116 causes the automatic control circuit 190 to revert to its initial position in readiness to begin a new cycle of operations.

To apply a bias voltage through the bias shoes 100 and 101 when a lug on the chain 116 contacts the tripping arm of the switch 146, the automatic control circuit activates the brake 127 to stop the motor 126 to precisely position a gripper 118 or 119 in position to receive the edge of a copy sheet as illustrated by FIGURE 4.

Referring again to FIGURE 7, it will be seen that one terminal of the winding of the solenoid 94 is connected to the electrical line 197 while its second terminal of its winding is connected by the electrical line 206 to the switch 99 which is, in turn, connected by the electrical line 207 to the automatic control circuit 190 of the apparatus. The second terminal of the solenoid 94 is connected by electrical line 229 to switch 230 which has its second terminal connected to line 191.

The automatic control circuit is equipped with a series of seven switches 208, 209, 210, 211, 212, 213 and 214 which are, respectively, connected thereto by the electrical lines 215, 216; 217, 218; 219, 220; 221, 222; 223, 224; 225, 226; and 227, 228. The momentary closing of the switch 208 while the switches 209, 210, 211, 212, 213 and 214 are open discontinues the operation of that portion of the automatic control circuit which automatically operates the solenoid 94, permitting its manual operation by the switch 230. The momentary closing of the switch 230 by the operator of the apparatus energizes the solenoid 94 and causes it to add one increment of toner to the compartment 11 of the toner unit 110.

The automatic control circuit 190 of the apparatus is equipped to supply electrical current through the line 99 and the normally closed switch 99 to energize the solenoid 94 to cause it to retract its core and by means of the rachet arm cause the movement to the toner feed roll 17 through a fraction of its circumference to move an increment of toner from compartment 13 to compartment 11 of the toner unit 110 when the switches 208 and 230 are open and one of the switches 209, 210, 211, 212 or 213 is closed. The switch 99 opens when the solenoid core reaches its fully retracted position and the core is returned to its extended position by the tension of the spring 97. This action places the solenoid 94 in condition to supply another increment of toner powder to the compartment 11 upon receiving another electrical pulse from the automatic control circuit 190.

In operating the solenoid in this manner, the automatic control circuit 190 is adapted to supply an increment of toner powder in synchronism with the operation of the first section 115 of the conveyor system of the apparatus at intervals determined by the particular one of the switches 209, 210, 211, 212, 213 which is closed by the operator of the apparatus. For example, it may supply an electrical pulse and an increment of toner after the toning of four, eight, twelve, sixteen or twenty latent electrostatic images, as may be desired, by the operator of the apparatus.

In the foregoing, many details of the toner apparatus in accordance with this invention have been given. It will be readily apparent to those skilled in the art that many variations can be made in the details of the apparatus without departing from the spirit of the invention or the scope of the claims which follow.

We claim:
1. A toner unit adapted for the application of a powdered, solid resinous toner to an electrostatic image carried by a photoelectrostatic coating on a copy sheet which comprises in combination:

a stationary cylindrical core of a non-magnetic material having its axis in approximately a horizontal position, and a plurality of longitudinal grooves countersunk in its cylindrical surface at spaced intervals around at least a substantial part of its circumference;

an elongated, closely fitting strip of a permanently magnetic material positioned within each of the said grooves in the surface of the stationary core;

a means for adjusting the circumferential position of the said cylindrical core and for locking it in its adjusted position, whereby the positions of the said magnetic strips with respect to the upper horizontal tangent of the circumference of the said core can be accurately adjusted;

a rotatable, hollow cylindrical core of a non-magnetic material positioned around the stationary core and the longitudinal magnetic strips carried in its cylindrical surface;

a tray for retaining a body of a toner mix in contact with the lower part of the said rotatable cylinder;

a means for rotating the said hollow cylinder around the said stationary core; and a doctor blade adjacent the said rotatable, hollow cylinder, paralleling the length of the said cylinder, spaced away from its surface by a uniform distance along its length, and adjacent a location at which the surface of the cylinder is moved in an upwardly direction by the said means for rotating it around the stationary core.

2. A toner unit adapted for the application of a powdered, solid resinous toner to an electrostatic image carried by a photoelectrostatic coating on a copy sheet, which comprises in combination:

a stationary cylindrical core of a non-magnetic material having its axis in approximately a horizontal position, and a plurality of longitudinal grooves countersunk in its cylindrical surface at spaced intervals around at least a substantial part of its circumference;

an elongated closely fitting strip of a permanently magnetic material positioned within each of the said grooves in the stationary core;

a rotatable hollow cylindrical core of a non-magnetic material positioned around the stationary core and the longitudinal magnetic strips carried in its cylindrical surface;

a tray comprising two elongated, side-by-side compartments which are connected by a longitudinal slot near the bottom of the tray, one of the said compartments being adapted for retaining a body of toner mix in contact with the lower part of the said rotatable cylinder, and the second compartment being adapted for carrying a supply of an enriched toner mix;

at least one rotatable stirrer positioned at a level below the rotatable cylinder in the first compartment;

a means for rotating the said hollow cylinder around its stationary core, and for rotating the said stirrer;

a grooved rotatable cylinder positioned within the second compartment of the said tray adjacent the longitudinal slot connecting that compartment with the first compartment, which closes the said slot when in a stationary position, and when rotated, will transfer an enriched toner mixture from the second compartment into the first compartment; and a means for causing the rotation of the said grooved cylinder in the second compartment through successive fractions of its circumference.

3. The toner unit adapted for the application of a powdered, solid resinous toner to an electrostatic image carried by a photoelectrostatic coating on a copy sheet, described by claim 2, in which the means for causing the rotation of the said grooved cylinder in the second compartment through successive fractions of its circumference comprises in combination:

a rachet attached to the axle of the said grooved cylinder outside the said second compartment;

a lever arm pivotally mounted adjacent the said rachet on the end of the axle of the said grooved cylinder;

a pawl pivotally mounted on the said lever arm adjacent the periphery of the said rachet in a position to engage and rotate the rachet through a fraction of its circumference when the free end of the lever arm moves in one direction, but not when it moves in the reverse direction;

a second pawl which prevents any inadvertent movement of the said rachet when the lever arm is moved in the reverse direction;

a solenoid, the core of which is pivotally connected to the free end of the said lever arm, the solenoid being in a position with respect to the lever arm to cause the movement of the end of the lever arm in the direction which rotates the said rachet by the retraction of its core upon being energized;

a spring connected to the free end of the lever arm which exerts tension on the lever arm to cause it to move in a direction reverse to that in which it is moved by the reaction of the solenoid core; and an electrical means to provide electrical pulses to briefly energize the said solenoid.

4. The toner unit adapted for the application of a powdered, solid resinous toner to an electrostatic image carried by a photoelectrostatic coating on a copy sheet, described by claim 2, in which the means for causing the rotation of the said grooved cylinder in the second compartment through successive fractions of its circumference comprises in combination:

an electrical solenoid;

a mechanical means connected to the core of the said solenoid for the rotation of the said grooved roll through a minor fraction of its circumference each time the solenoid is energized;

an electrical means for setting any one of a plurality of electrostatic images to be toned between consecutive electrical pulses to energize the said solenoid; and a second electrical means controlled by the setting of the first electrical means which sends successive electrical pulses to the said solenoid at intervals controlled by the setting of the first electrical means as to the number of electrostatic images to be toned between consecutive pulses.

5. A toner mechanism for the application of a powdered, solid resinous toner to an electrostatic image carried by a photoelectrostatic coating on a copy sheet in the form of a self-contained unit which is adapted to form a readily removable, interchangeable component part of apparatus for the photoelectrostatic reproduction of images, which comprises in combination:

a tray which is subdivided into at least two compartments which are generally rectangular in shape, one of which is elongated and the second of which is adjacent a shorter side of the elongated compartment;

two toner rolls positioned side-by-side in the elongated compartment, each of which comprises;

a stationary cylindrical core of a non-magnetic material having its axis in approximately a horizontal position, and a plurality of longitudinal grooves countersunk in its cylindrical surface at equally spaced intervals around approximately two-thirds of its circumference;

an elongated, closely fitting, permanently magnetic plastic strip positioned within each of the said grooves of the stationary core;

a rotatable hollow cylindrical core of a non-magnetic material positioned around the stationary core, having the end of a shaft extending into the second compartment of the said tray;

four rotatable stirrers positioned near the first compartment at a level below that of the said toner rolls, each of which having the end of its shaft extending into the second compartment;

a means for adjusting the circumferential position of the said cylindrical core, and for locking it into its adjusted position wtih respect to one wall of the said tray; and a gear train within the second compartment connected to the ends of the shafts of the said rotatable cylinders and the said stirrers, and to a shaft which extends through an outer wall of the said tray and carries on its outer end one-half of a coupling which is adapted to mate with a second half of the coupling which is connected to a source of rotary power;

the said gear train being capable of rotating the said cylinders and the said stirrers when the said half-coupling is rotated.

6. A toner mechanism for the application of a powdered, solid resinous toner to an electrostatic image carried by a photoelectrostatic coating on a copy sheet in the form of a self-contained unit which is adapted to form a redaily removable, interchangeable component part of apparatus for the photoelectrostatic reproduction of images, which comprises in combination:

a tray which is subdivided into at least two compartments which are generally rectangular in shape, one of which is elongated and the second of which is adjacent a shorter side of the elongated compartment;

two toner rolls positioned side-by-side in the elongated compartment, each of which comprises;

a stationary, cylindrical core of a non-magnetic material having its axis in approximately a horizontal position, and a plurality of longitudinal grooves countersunk in its cylindrical surface at equally spaced intervals around approximately two-thirds of its circumference;

an elongated, closely fitting, permanently magnetic plastic strip positioned within each of the said grooves of the stationary core;

a rotatable, hollow cylindrical core of a non-magnetic material positioned around the stationary core, having the end of a shaft extending into the second compartment of the said tray;

four rotatable stirrers positioned near the first compartment at a level below that of the said toner rolls, each of which having the end of its shaft extending into the second compartment;

a means for adjusting the circumferential position of the said cylindrical core, and for locking it in its adjusted position with respect to one wall of the said tray;

a doctor blade adjacent each of the said rotatable cylinders, paralleling the length of the said cylinder, spaced away from its surface by a uniform distance along its length, and adjacent a location at which the surface of the cylinder is moved in an upwardly direction; and a gear train within the second compartment connected to the ends of the shafts of the said rotatable cylinders and the said stirrers, and to a shaft which extends through an outer wall of the said tray and carries on its outer end one-half of a coupling which is adapted to mate with a second half of the coupling which is connected to a source of rotary power;

the said gear train being capable of rotating the said cylinders and the said stirrers when the said half-coupling is rotated.

7. A toner mechanism for the application of a powdered, solid resinous toner to an electrostatic image carried by a photoelectrostatic coating on a copy sheet in the form of a self-contained unit which is adapted to form a readily removable, interchangeable component part of apparatus for the photoelectrostatic reproduction of images, which comprises in combination:
- a tray which is subdivided into three compartments which are generally rectangular in shape, two of which are elongated, positioned side-by-side, and connected by a slot near the bottom of the tray, and the third of which is adjacent one of the ends of the elongated compartments;
- two toner rolls positioned side-by-side in one of the elongated compartments, each of which comprises;
- a stationary cylindrical core of a non-magnetic material having its axis in approximately a horizontal position, and a plurality of longitudinal grooves countersunk in its cylindrical surface at equally spaced intervals around approximately two-thirds of its circumference;
- an elongated, closely fitting, permanently magnetic plastic strip positioned within each of the said grooves of the stationary core;
- a rotatable, hollow cylindrical core of a non-magnetic material positioned around the stationary core, having the end of a shaft extending into the third compartment of the said tray;
- four rotatable stirrers positioned near the first compartment at a level below that of the said toner rolls, each of which having the end of its shaft extending into the third compartment;
- a means for adjusting the circumferential position of the said cylindrical core, and for locking it in its adjusted position with respect to one wall of the said tray;
- a gear train within the third compartment connected to the ends of the shafts of the said rotatable cylinders and the said stirrers, and to a shaft which extends through an outer wall of the said tray and carries on its outer end one-half of a coupling which is adapted to mate with a second half of the coupling which is connected to a source of rotary power;
- the said gear train being capable of rotating the said cylinders and the said stirrers when the said half-coupling is rotated;
- a grooved rotatable cylinder positioned within the third compartment of the said tray adjacent the longitudinal slot connecting that compartment with the first compartment which closes the said slot when in a stationary position, and when rotated, will transfer an enriched toner mixture from the third compartment into the first compartment; and
- a means for causing the rotation of the said grooved cylinder in the third compartment through successive fractions of its circumference.

8. An apparatus adapted for the reproduction of images on photoelectrostatic copy sheets, which comprises in combination:
- a conveyor adapted to carry a flexible sheet from one location to another which includes:
- a pair of continuous conveyor chains which are of the same length and spaced apart in vertical parallel planes;
- a plurality of pairs of sprockets which engage the said chains and keep them taut, two pairs of which are spaced apart to carry the said chains in a substantially horizontal plane during a portion of their lengths;
- a means for driving one pair of the sprockets carrying the said chain; and
- at least one sheet gripper adapted to grasp the edge of a copy sheet, and to carry the sheet which is attached at its ends to the said chains with its length normal to the said vertical planes;
- a toner unit which includes:
- a tray for holding a toner mixture, which is electrically insulated from the remainder of the apparatus;
- a rotatable, magnetic toner roll within the said tray; and
- a means for rotating the said toner roll through an electrically non-conductive drive; and
- a source of D.C. electrical potential connected to the said unit;
- the said unit being located below the parallel plane through which the said conveyor chains pass;
- a bias shoe located above the said toner roll in a position to contact the back of a copy sheet carried by the said gripper at the location at which its face is in contact with a magnetic brush of toner mixture carried by the said toner roll, the said bias shoe being electrically insulated from the remainder of the apparatus; and
- an electrical means which is operated by the movement of one of the said conveyor chains connected to the said shoe, which connects the shoe to ground as the leading edge of a copy sheet is brought beneath it, and breaks that connection when the trailing edge of the sheet reaches the shoe.

9. In apparatus adapted for the reproduction of images on photoelectrostatic copy sheets, which comprises the combination of a conveyor adapted to carry a flexible sheet from one location to another, a toner unit, and a bias shoe described by claim 8, in which:
- a first limit switch is positioned adjacent the path of travel of one of the conveyor chains;
- a second limit switch is positioned adjacent the path of travel of the same conveyor chain, and spaced forwardly along the line of travel of the chain from the location of the first limit switch;
- a lug carried by the said conveyor chain which is adapted to trip the first limit switch and then the second limit switch as it is carried past them by the movement of the chain;
- the said lug and the said limit switches being located with respect to the length of the said conveyor chain and the location of the gripper on the chain at positions such that when the gripper reaches a position which brings the leading edge of the image area of a copy sheet beneath the bias shoe, the first limit switch is tripped by the lug, and when the gripper reaches a position which brings the trailing edge of the image area of the copy sheet beneath the bias shoe, the second limit switch is tripped; and
- an electrical system connected between the limit switches and the bias shoe which establishes an electrical connection between the bias shoe and ground when the first limit switch is tripped, and then breaks the said electrical connection when the second limit switch is tripped.

10. In apparatus adapted for the reproduction of images on photoelectrostatic copy sheets, which comprises in combination:
- a conveyor adapted to carry a flexible sheet from one location to another which includes:
- a pair of continuous conveyor chins which are of the same length and spaced apart in vertical parallel planes;
- a plurality of pairs of sprockets which engage the said chains and keep them taut, two pairs of which are spaced apart to carry the said chains in a substantially horizontal plane during a portion of their lengths;
- a means for driving one pair of the sprockets carrying the said chain; and
- two sheet grippers, each of which is adapted to grasp the edge of a copy sheet and to carry the sheet which is attached at its ends to the said chains with its length normal to the said vertical planes, the said sheet grippers being spaced apart along the length of the chains by approximately one-half their lengths;
a toner unit which includes:
a tray for holding a toner mixture which is electrically insulated from the remainder of the apparatus;
two rotatable, magnetic toner rolls positioned side-by-side within the said tray;
a means for rotating the said toner rolls through an electrically non-conductive drive; and
a source of D.C. electrical potential connected to the said unit;
the said unit being located below the parallel plane through which the said conveyor chains pass;
a bias shoe located above each of the said toner rolls in a position to contact the back of a copy sheet carried by one of the said grippers at the location at which its face is in contact with a magnetic brush of a toner mixture carried by the adjacent toner roll, each of the said bias shoes being electrically insulated from each other and from the remainder of the apparatus; and
electrical means operated by the movement of one of the said conveyor chains connected to each of the said shoes, which connects the shoe to ground as the leading edge of a copy sheet is brought beneatth it, and breaks that connection when the trailing edge of the sheet reaches the shoe.

11. In apparatus adapted for the reproduction of images on photoelectrostatic copy sheets, which comprises the combination of a conveyor adapted to carry a flexible sheet from one location to another, a toner unit including two toner rolls, and two bias shoes as described by claim 9 in which:
a series of four limit switches are positioned adjacent the path of travel of one of the conveyor chains, and spaced apart in the direction of its travel;
two lugs carried by the said conveyor chains which are adapted to successively trip each of the four limit switches as they are carried past them by the movement of the chains;
the said lugs being spaced apart along the length of the chains by approximately one-half of their lengths;
the said lugs and the said limit switches being located with respect to the length of the conveyor chains and the location of the grippers on the chain at positions such that when one of the grippers reaches a position which brings the leading edge of the image area of a copy sheet beneath the first of the two bias shoes in the direction of travel of the copy sheet, the first limit switch is tripped by one of the said lugs;
the second limit switch is tripped when that leading edge reaches the second of the bias shoes;
the third limit switch is tripped when the gripper reaches a position which brings the trailing edge of the image area of the copy sheet beneath the first bias shoe; and
the fourth limit switch is tripped when the trailing edge of the image area comes beneath the second bias shoe, and when the second of the two grippers reaches a position which brings the the leading edge of the image area of a copy sheet beneath the first of the two bias shoes, the first limit switch is tripped by the second of the said lugs, the second limit switch is tripped when that leading edge reaches the second of the bias shoes, the third limit switch is tripped when the gripper reaches a position which brings the trailing edge of the image area of the copy sheet beneath the first bias shoe, and the fourth limit switch is tripped when the trailing edge of the image area comes beneath the second bias shoe; and
an electrical system connected between the limit switches and the bias shoes, which establishes an electrical connection between the first bias shoe and ground when the first limit switch is tripped, establishes an electrical connection between the second bias shoe and ground when the second switch is tripped, breaks the said electrical connection between the first bias shoe and ground when the third switch is tripped, and breaks the said electrical connection between the second bias shoe and ground when the fourth switch is tripped.

References Cited

UNITED STATES PATENTS

| | | | |
|---|---|---|---|
| 2,972,332 | 2/1961 | Limberger | 95—1.7 X |
| 3,003,462 | 10/1961 | Streich | 118—637 |
| 3,040,704 | 6/1962 | Bliss | 118—637 |
| 3,059,614 | 10/1962 | Limberger | 118—637 |
| 3,081,737 | 3/1963 | Frantz et al. | 118—223 X |
| 3,152,924 | 10/1964 | Wanielista et al. | 118—637 |
| 3,176,652 | 4/1965 | Mott et al. | 118—637 |

CHARLES A. WILLMUTH, *Primary Examiner.*

P. FELDMAN, *Assistant Examiner.*